(No Model.)  J. F. PALMER.  2 Sheets—Sheet 1.
PNEUMATIC TIRE.
No. 476,681.  Patented June 7, 1892.
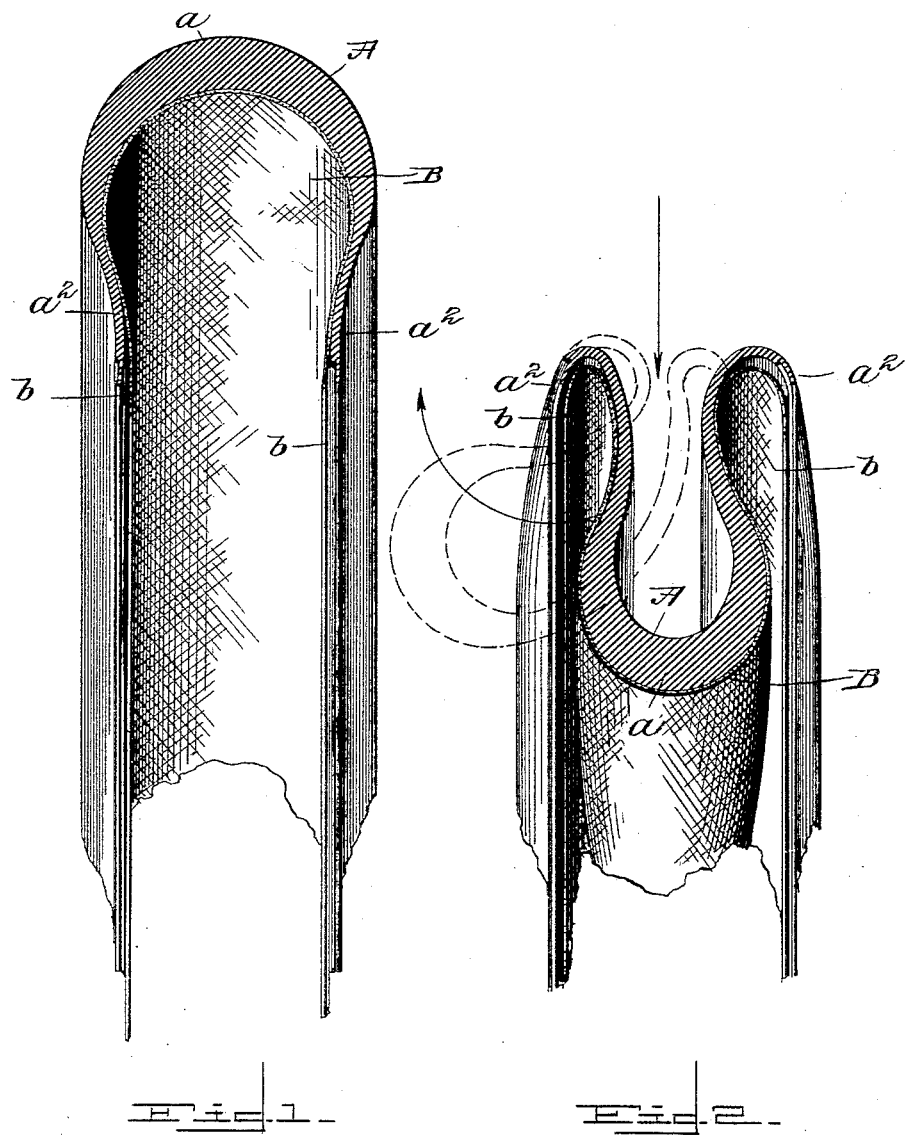
Witnesses
W. H. Pumphrey
Bruce L. Elliott
Inventor
John F. Palmer,
By his Attorneys
Dyrenforth and Dyrenforth.

(No Model.) 2 Sheets—Sheet 2.
J. F. PALMER.
PNEUMATIC TIRE.
No. 476,681. Patented June 7, 1892.
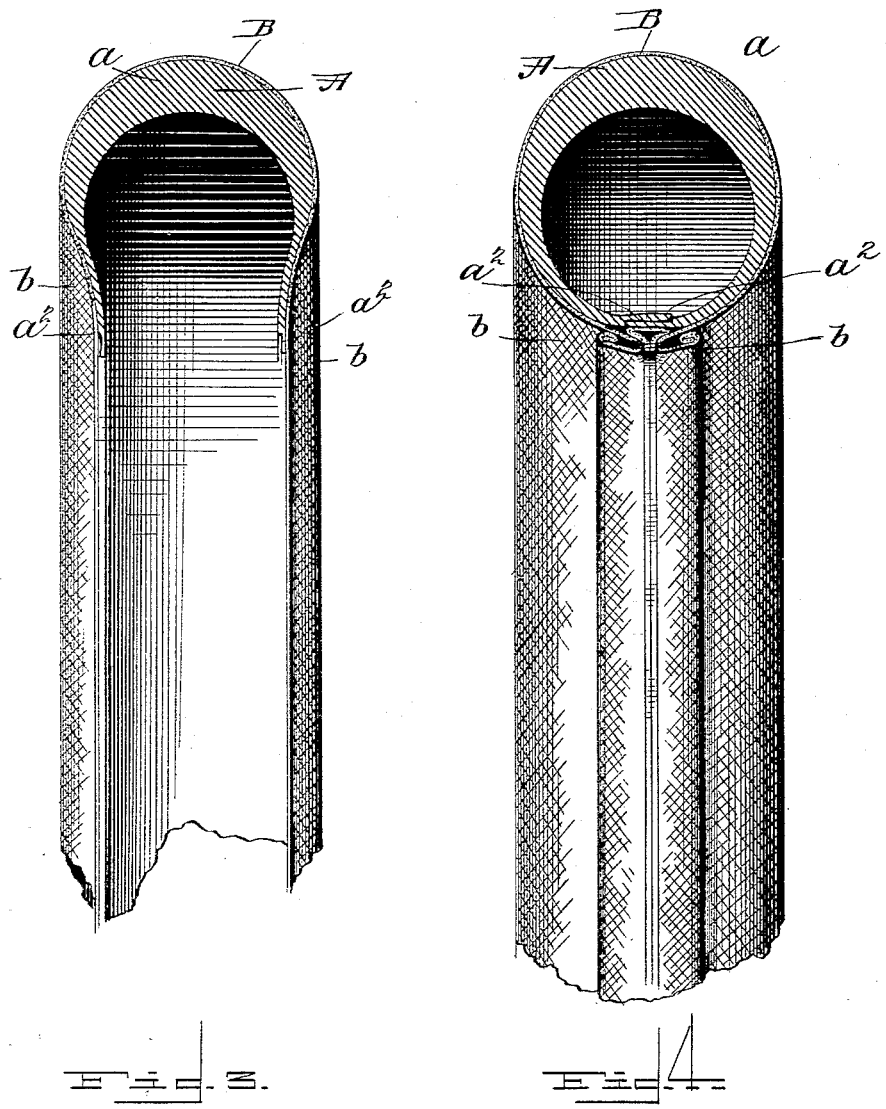
Witnesses
W. H. Humphrey
Bruce A. Elliott
Inventor
John F. Palmer
By his Attorneys
Dyrenforth and Dyrenforth

UNITED STATES PATENT OFFICE.

JOHN F. PALMER, OF RIVERSIDE, ILLINOIS.

PNEUMATIC TIRE.

SPECIFICATION forming part of Letters Patent No. 476,681, dated June 7, 1892.

Application filed April 23, 1892. Serial No. 430,300. (No model.)

*To all whom it may concern:*

Be it known that I, JOHN FULLERTON PALMER, a citizen of the United States, residing at Riverside, in the county of Cook and State of Illinois, have invented a new and useful Improvement in Pneumatic Tires; and I hereby declare the following to be a full, clear, and exact description thereof.

My invention relates to the production of a pneumatic tire of the kind which are known as " healing," and is in the nature of an improvement upon the pneumatic tire which forms the subject-matter of Letters Patent No. 467,642, granted to me January 26, 1892. As in the case of the tire described in said Letters Patent, the purpose of my invention is to provide in the tire, composed mainly of rubber and containing air under pressure, a tread portion of increased thickness and held, as it is called, "under compression," but more properly speaking "under contraction," and thickened, whereby any punctures that may occur in the tread portion, as by a pin-point, knife-blade, sharp stone, or the like, shall be automatically closed and the exhaust of air through said puncture shall be prevented. Incidentally the characteristics thus given to the tire permit the same to be inflated without the provision of the air-filling tube, the operation being effected by introducing a sharp-pointed hollow needle or nozzle connected with an air-pump.

My invention consists more particularly in an inner tube for a pneumatic tire having its tread portion made of thickened rubber and held under compression by causing the same to be curved from a concave to a convex position by mechanical manipulation, regardless of the presence or absence of internal pneumatic pressure, this result being accomplished by molding the rubber upon a canvas strip having the width substantially of the tread portion and of a character to be substantially non-stretching and non-lengthening, the canvas and rubber being molded primarily upon a curvature transversely the reverse of the intended curvature in the finished tire. It is clearly within my invention, however, to provide for the reversal of the curvature longitudinally as well as transversely, the effect being to give a substantial compression of the thickened rubber held against the canvas backing by being molded thereon. In order that the rubber thus molded may be formed into a tube, the lateral edges thereof beyond the point where it is caused to adhere to the canvas are continued into flaps of a length sufficient when joined together at their edges to produce an inner air-tube of the desired sectional measurement. The canvas to which the rubber is molded may be further continued laterally into flaps not adhering to the rubber, said flaps being sewed together with or without the interposed reinforcing-piece in the manner described in my said granted Letters Patent.

My invention consists, therefore, in the general and in the preferred method of producing the pneumatic tire herein set forth.

In the drawings, Figure 1 is a transverse sectional view illustrating the method of molding the rubber upon the canvas before reversing the curvature to produce a compression or contraction of the tread portion. Fig. 2 is a view illustrating the position of the tube in the act of reversing the curvature; Fig. 3, a view showing the tube reversed before sealing, and Fig. 4 a sectional view of a tire after the same has been formed into a tube.

A represents the rubber portion of an inner tube for pneumatic wire, and B the canvas-retaining strip therefor, the office of which is particularly to serve as an inelastic backing for the tread portion, through the medium of which, on reversal of curvature, the requisite compression or contraction is effected. As will be observed upon an examination of Figs. 1 and 2, the rubber portion A comprises a section $a$, which is thickened, and two lateral flaps $a^2$, which are not thickened, and have their edges by preference cut out for the purpose of joining them together. By preference, also, the canvas backing is extended laterally into flaps $b$, the edges of which may be sewed together in completing the tube. It should be understood, however, that the flaps of canvas $b$ may be entirely omitted without departing from my invention or in any sense affecting its operativeness, their employment being purely arbitrary.

To produce the tire I proceed as follows:

Upon a ring-shaped mandrel, properly curved in cross-section, the strip of canvas is firmly stretched, and in order to bring about a conformity with the curvature of the mandrel the canvas may comprise two strips opposite in their character, each cut on the diagonal, with longitudinally-diagonal long fibers and transversely-diagonal short fibers, although it should be understood that any other mode of giving to the canvas a non-stretching character, coupled with a suitable curvature to conform to the mandrel, may be employed in its place without departing from my invention. In this connection it may be further stated that canvas is not the only material which I intend to employ, any suitable flexible material having the essentially-requisite characteristics being capable of use without departing from my invention. The canvas having been applied to the mandrel with or without the flaps $b$, the rubber portion of the inner tube is thereupon molded upon the mandrel carrying the canvas, as described. The tread portion of the rubber is thickened, and it is found in some cases convenient to mold the thickened portion and the flap portion separately—that is to say, first to mold the rubber with the thickness of the flap portion and in a continuous strip from edge to edge, and afterward to mold on the tread portion a further strip of the width intended to give to the tread portion an increased thickness. It is to be understood that it is usually found desirable to mold the rubber before vulcanization, supplying it with the requisite vulcanizing ingredients, and after it has been molded upon the mandrel in the manner described it is subjected to the proper heat, &c., for producing vulcanization. One effect of vulcanization is to produce an intimate cohesion between the canvas backing and the tread portion of the tire on the under face thereof or that adjacent to the mandrel. After vulcanization the canvas and the rubber secured thereto are withdrawn from the mandrel and the curvature reversed in the manner illustrated in Figs. 1, 2, and 3, so that whereas the canvas when on the mandrel was between the rubber and the center of the ring it has become changed to a position where the rubber shall be between the canvas and the center of the ring, the canvas in this operation being changed from a concave to a convex form in cross-section and the thickened or tread portion of the tube being caused to have a reverse curvature to correspond. It is not deemed absolutely requisite that a perfect curve in cross-section shall be produced, as it is found that a change from a concave to a very slightly convex or approximately flat condition produces a desirable result in the finished product. It is merely essential that such a change in the curvature of the canvas in cross-section, and hence the curvature of the thickened rubber, shall be effected as will bring about a substantial compression or contraction of the thickened rubber. The curvature being effected as described, the free ends of the flaps $a^2$ of rubber are joined together by a suitable cement, the strength of the joint being materially increased by the outer envelope of canvas generally employed with tires of this nature.

For the purpose of inflating the tire the point of a syringe-pump may be inserted through the tread portion and air thus forced in. When the point is withdrawn, the normal tendency given to the rubber by the compression effected under the influence of the curvature of the canvas serves automatically to close the puncture and prevent the air from exhausting. Any small aperture that may occur in the tire at the tread portion is automatically closed for the same reason.

It is to be noted that the characteristic quality thus given to the tread portion is present regardless of the fact whether air under compression is introduced into the tube or not. In referring to air as the tube-inflating medium it is to be understood that I intend to cover steam, gas, water, or any fluid that may be available as a substitute for air, and the term "rubber" is intended to cover the genus of which rubber is the best-known example.

What I claim as new, and desire to secure by Letters Patent, is—

1. An inner tube for a pneumatic tire for bicycles, &c., having the tread portion of increased thickness held normally under compression, as described, and having at its hub side a continuous sealed joint, substantially as described.

2. The method of producing an inner tube for pneumatic tires, which consists in molding the rubber therefor with a thickened tread portion on a reverse curvature, causing to adhere to the concave face a substantially non-stretching flexible material, reversing the curvature of the tread portion and non-stretching backing, and finally joining the flaps and sealing the same, substantially as described.

3. The method of producing an inner tube for pneumatic tubes, which consists, first, in applying to an annular mandrel having the proper curvature, a curved non-stretching annular strip of flexible material, molding upon said mandrel a strip of rubber having its edges unjoined, thickening the rubber on the outer side of the mandrel or form, vulcanizing the parts together, and thereupon reversing the curvature of the flexible material and thickened portion of the rubber, and joining and sealing the edges of the strip to form the air-tube, substantially as described.

In testimony whereof I affix my signature, in presence of two witnesses, this 19th day of April, A. D. 1892.

JOHN F. PALMER.

Witnesses:
J. ROSS COLHOUN,
DOUGLAS DYRENFORTH.